US00RE43089E

(19) United States
(12) Reissued Patent
Olmstead et al.

(10) Patent Number: US RE43,089 E
(45) Date of Reissued Patent: Jan. 10, 2012

(54) IMAGING SYSTEM WITH A LENS HAVING INCREASED LIGHT COLLECTION EFFICIENCY AND A DEBLURRING EQUALIZER

(75) Inventors: Bryan L. Olmstead, Eugene, OR (US); Alan Shearin, Eugene, OR (US)

(73) Assignee: Datalogic Scanning, Inc., Eugene, OR (US)

(21) Appl. No.: 12/437,447

(22) Filed: May 7, 2009

Related U.S. Patent Documents

Reissue of:

(64) Patent No.: 7,215,493
Issued: May 8, 2007
Appl. No.: 11/045,213
Filed: Jan. 27, 2005

(51) Int. Cl.

| | |
|---|---|
| ***G02B 9/04*** | (2006.01) |
| ***H04N 5/225*** | (2006.01) |
| ***H04N 5/235*** | (2006.01) |
| ***H04N 7/01*** | (2006.01) |
| ***G06K 7/10*** | (2006.01) |

(52) U.S. Cl. ..... 359/793; 359/716; 359/646; 359/691; 359/639; 359/637; 348/340; 348/335; 348/362; 348/360; 348/441; 348/308; 348/241; 235/462.11

(58) Field of Classification Search ..... 359/629–631, 359/639, 691, 692, 558, 646, 661, 716, 738, 359/793, 637; 348/308, 335, 340, 342, 241, 348/360, 362, 296, E5.037, E5.038, 441; 235/454, 462.01, 462.11, 462.28, 462.42; 250/235, 311; 356/3, 391

See application file for complete search history.

(56) References Cited

U.S. PATENT DOCUMENTS

| | | | |
|---|---|---|---|
| 2,017,190 | A | 10/1935 | Waide |
| 3,614,310 | A | 10/1971 | Korpel |
| 4,082,431 | A | 4/1978 | Ward |
| 4,275,454 | A | 6/1981 | Klooster |
| 4,308,521 | A | 12/1981 | Casasent et al. |
| 4,804,249 | A | 2/1989 | Reynolds et al. |
| 4,864,249 | A | 9/1989 | Reiffin |
| 5,003,166 | A | 3/1991 | Girod |

(Continued)

FOREIGN PATENT DOCUMENTS

| | | |
|---|---|---|
| CN | 1517738 | 8/2004 |

(Continued)

OTHER PUBLICATIONS

Jaroszewicz et al., "Lens Axicons: Systems Composed of a Diverging Aberrated Lens and a Perfect Converging Lens," *J. Opt. Soc. Am*, vol. 15, No. 9, Sep. 1998, pp. 2383-2390.

(Continued)

*Primary Examiner* — Loha Ben
(74) *Attorney, Agent, or Firm* — Stoel Rives LLP

(57) ABSTRACT

In one form, an imaging system comprises an imager that forms an image of an object in a field of view, a rotationally symmetric lens assembly disposed between the imager and the object, and an equalizer. The rotationally symmetric lens assembly provides increased collection efficiency for a given depth of field, whereby the rotationally symmetric lens assembly causes aberration, compared to a well-focused lens. The rotationally symmetric lens assembly comprises a front negative lens, a rear positive lens, and an aperture positioned between the front and rear lenses. The equalizer, which is connected to the imager, receives image data and at least partially compensates for the aberration caused by the rotationally symmetric lens assembly.

63 Claims, 5 Drawing Sheets

U.S. PATENT DOCUMENTS

| | | | | |
|---|---|---|---|---|
| 5,080,456 | A | | 1/1992 | Katz et al. |
| 5,142,413 | A | | 8/1992 | Kelly |
| 5,164,584 | A | | 11/1992 | Wike et al. |
| 5,187,353 | A | * | 2/1993 | Metlitsky et al. |
| 5,233,170 | A | * | 8/1993 | Metlitsky et al. |
| 5,278,397 | A | | 1/1994 | Barkan et al. |
| 5,307,175 | A | | 4/1994 | Seachman |
| 5,315,095 | A | | 5/1994 | Marom et al. |
| 5,331,143 | A | | 7/1994 | Marom et al. |
| 5,332,892 | A | | 7/1994 | Li et al. |
| 5,347,121 | A | | 9/1994 | Rudeen |
| 5,352,922 | A | | 10/1994 | Barkan et al. |
| 5,359,185 | A | | 10/1994 | Hanson |
| 5,371,361 | A | | 12/1994 | Arends et al. |
| 5,386,105 | A | | 1/1995 | Quinn et al. |
| 5,418,356 | A | | 5/1995 | Takano |
| 5,422,472 | A | | 6/1995 | Tavislan et al. |
| 5,426,521 | A | | 6/1995 | Chen et al. |
| 5,438,187 | A | | 8/1995 | Reddersen et al. |
| 5,446,271 | A | | 8/1995 | Cherry et al. |
| 5,475,208 | A | | 12/1995 | Marom |
| 5,486,688 | A | | 1/1996 | Lima et al. |
| 5,506,392 | A | | 4/1996 | Barkan et al. |
| 5,583,342 | A | | 12/1996 | Ichie |
| 5,623,137 | A | | 4/1997 | Powers et al. |
| 5,625,495 | A | | 4/1997 | Moskovich |
| 5,635,699 | A | | 6/1997 | Cherry et al. |
| 5,646,391 | A | | 7/1997 | Forbes et al. |
| 5,714,750 | A | | 2/1998 | Eastman et al. |
| 5,717,194 | A | | 2/1998 | Forbes et al. |
| 5,745,176 | A | | 4/1998 | Lebens |
| 5,748,371 | A | | 5/1998 | Cathey et al. |
| 5,756,981 | A | | 5/1998 | Roustaei et al. |
| 5,770,847 | A | | 6/1998 | Olmstead |
| 5,796,528 | A | | 8/1998 | Mihara |
| 5,814,803 | A | | 9/1998 | Olmstead et al. |
| 5,825,044 | A | | 10/1998 | Allen et al. |
| 5,945,670 | A | | 8/1999 | Rudeen |
| 5,959,669 | A | | 9/1999 | Mizoguchi et al. |
| 6,042,012 | A | | 3/2000 | Olmstead et al. |
| 6,056,198 | A | | 5/2000 | Rudeen et al. |
| 6,057,971 | A | | 5/2000 | Mihara |
| 6,066,857 | A | | 5/2000 | Fantone et al. |
| 6,069,738 | A | | 5/2000 | Cathey et al. |
| 6,073,851 | A | | 6/2000 | Olmstead et al. |
| 6,097,856 | A | | 8/2000 | Hammond |
| 6,098,887 | A | | 8/2000 | Figarella et al. |
| 6,142,376 | A | | 11/2000 | Cherry et al. |
| 6,147,816 | A | | 11/2000 | Ori |
| 6,152,371 | A | | 11/2000 | Schwartz et al. |
| 6,164,540 | A | | 12/2000 | Bridgelall et al. |
| 6,209,788 | B1 | | 4/2001 | Bridgelall et al. |
| 6,276,606 | B1 | | 8/2001 | Liou et al. |
| 6,290,135 | B1 | | 9/2001 | Acosta et al. |
| 6,347,742 | B2 | | 2/2002 | Winarski et al. |
| 6,493,061 | B1 | | 12/2002 | Arita et al. |
| 6,523,750 | B1 | | 2/2003 | Dickson et al. |
| 6,536,898 | B1 | | 3/2003 | Cathey et al. |
| 6,540,145 | B2 | | 4/2003 | Gurevich et al. |
| 6,545,714 | B1 | | 4/2003 | Takada |
| 6,568,594 | B1 | | 5/2003 | Hendriks et al. |
| 6,616,046 | B1 | | 9/2003 | Barkan et al. |
| 6,633,433 | B2 | | 10/2003 | Bergstein et al. |
| 6,651,886 | B2 | | 11/2003 | Gurevich et al. |
| 6,661,458 | B1 | | 12/2003 | Takada et al. |
| 6,689,998 | B1 | | 2/2004 | Bremer |
| 6,732,930 | B2 | | 5/2004 | Massieu et al. |
| 6,747,702 | B1 | * | 6/2004 | Harrigan |
| 7,063,261 | B2 | * | 6/2006 | Vinogradov et al. |
| 7,499,090 | B2 | * | 3/2009 | Olmstead et al. |
| 7,593,161 | B2 | * | 9/2009 | George et al. |
| 2002/0148900 | A1 | | 10/2002 | Gurevich et al. |
| 2002/0154415 | A1 | | 10/2002 | Miyauchi et al. |
| 2003/0043463 | A1 | | 3/2003 | Li et al. |
| 2004/0136069 | A1 | | 7/2004 | Li et al. |
| 2006/0060653 | A1 | | 3/2006 | Wittenberg |
| 2006/0113386 | A1 | | 6/2006 | Olmstead |
| 2006/0164541 | A1 | | 7/2006 | Olmstead et al. |
| 2006/0171041 | A1 | | 8/2006 | Olmstead et al. |

| | | | |
|---|---|---|---|
| 5,187,353 | | | 235/462.35 |
| 5,233,170 | | | 235/462.35 |
| 6,747,702 | | | 348/335 |
| 7,063,261 | | | 235/454 |
| 7,499,090 | | | 348/296 |
| 7,593,161 | | | 359/637 |

FOREIGN PATENT DOCUMENTS

| | | |
|---|---|---|
| EP | 1014689 | 6/2000 |
| JP | 56050469 | 5/1981 |
| WO | WO 02/44791 A1 | 6/2002 |
| WO | WO-03052465 | 6/2003 |

OTHER PUBLICATIONS

Jaroszewicz et al., "Lens Axicons: Systems Composed of a Diverging Aberrated Lens and a Converging Aberrated Lens," *J. Opt. Soc. Am*, vol. 16, No. 1, Jan. 1999, pp. 191-197.

Smith, *Modern Optical Engineering: The Design of Optical Systems,* 2nd ed., (New York:McGraw Hill, 1990), pp. 20-25, 38-39, 60-63, 70-71, 133-135, 340-359, 416-419, 463-469.

McLeod, "The Axicon: A New Type of Optical Element," *J. Opt. Soc. Am.*, vol. 44, No. 8, Aug. 1954, pp. 592-597.

Sochacki et al., "Nonparaxial Design of Generalized Axicons," *Applied Optics,* vol. 31, No. 25, Sep. 1992, pp. 5326-5330.

Cathey et al., "New Paradigm for Imaging Systems," *Applied Optics,* vol. 41, No. 29, Oct. 2002, pp. 6080-6092.

Kubala et al., "Reducing Complexity in Computation Imaging Systems," CDM Optics, Inc., 2003.

Castro et al., "Asymmetric Phase Masks for Extended Depth of Field," *Applied Optics,* vol. 43, No. 17, Jun. 2004, pp. 3474-3479.

Molecular Expressions™, Optical Microscopy Primer: Digital Imaging in Optical Microscopy, "Introduction," http://micro.magnet.fsu.edu/primer/digitalimaging/index/html, Nov. 9, 2004.

Molecular Expressions™, Optical Microscopy Primer: Digital Imaging in Optical Microscopy, "Introduction to CMOS Image Sensors," http://micro.magnet.fsu.edu/primer/digitalimaging/cmosimagesensors/html, Nov. 9, 2004.

Modulation Transfer Function (no date); downloaded from http://www.mellesgriot.com/glossary/wordlist/glossary details asp?wID+263, visited May 2005.

Modulation Transfer Function (2003); downloaded from http://www.micro.magnet.fsu/edu/primer/anatomy/mthome.html, visited Nov. 2004.

Nikon Microcopy Modulation Transfer Function (no date); downloaded from http://www.mivroscopyu.com/articles/mtfintro.html, visited Nov. 2004.

International Search Report for PCT/US06/03060, issued Jun. 8, 2006.

Extended European Search Report that issued in European Application No. 06719770.7-2217 on Mar. 30, 2010.

Communication pursuant to Article 94(3) EPC that issued in European Application No. 06719770.702217 on Jul. 9, 2010.

Dowski et al., "Wavefront Coding: Jointly Optimized Optical and Digital Imaging Systems," CDM Optics, Inc., date unknown.

* cited by examiner

IMAGING SYSTEM WITH A LENS HAVING INCREASED LIGHT COLLECTION EFFICIENCY AND A DEBLURRING EQUALIZER

Matter enclosed in heavy brackets [ ] appears in the original patent but forms no part of this reissue specification; matter printed in italics indicates the additions made by reissue.

TECHNICAL FIELD

This disclosure relates generally to optical systems and elements as well as to image analysis, and more particularly to imaging systems with increased light collection efficiency creating optical aberrations that can be removed with a deblurring equalizer.

BACKGROUND

Most imaging systems typically employ a single focus point, at which focusing is optimum. While such systems can result in a sharply focused image when the object to be imaged is at the focus point, such systems are typically sensitive to variations in the distance between the object to be imaged and the imaging system or more particularly its focusing lens. While it is well known to increase the depth of field of a well-focused lens system by decreasing the aperture of the system, that can severely decreases light collection efficiency, thereby possibly limiting the speed at which such a system can operate.

Other techniques for imaging with an extended focusing depth have been contemplated. For example, U.S. Pat. No. 5,371,361, which is assigned to the same assignee as is this invention, discloses an imaging system having a soft-focus lens, which sacrifices the quality of mid-field focus to achieve near invariance of focus throughout a range of distances, in addition to equalization of the electronic image signal. As another example, U.S. Pat. No. 5,748,371 and related works by the inventors of that patent disclose a combination of particular optics (cubic phase mask) and digital signal processing to provide an in-focus response over a wide range of object distances. The cubic phase mask has an optical transfer function that is relatively insensitive to object distance over a predetermined range, and the digital signal processing is designed to undo the effects of the cubic phase mask on the optical transfer function (other than increased depth of field). The inventors of that patent claim that jointly designing complementary cubic phase mask and digital signal processing can result in imaging results not possible with optical elements only. However, a cubic phase mask is a complicated, asymmetric part that is expensive and cumbersome to fabricate. Moreover, the asymmetry of a cubic phase mask requires that the complementary digital signal processing be performed over two dimensions.

SUMMARY

The present invention provides improved imaging with increased light gathering efficiency over an extended depth of field.

According to one embodiment, a system comprises an imager, a rotationally symmetric lens assembly, and a signal processor. The imager forms an electronic image of an object in a field of view. The rotationally symmetric lens assembly is disposed between the imager and the object. The lens assembly provides increased collection efficiency for a given depth of field, whereby the lens assembly causes aberration, compared to a well-focused lens. The signal processor is connected to the imager. The signal processor receives image data and forms one or more virtual scan line signals comprising samples taken from one or more lines across the image at arbitrary angles. The signal processor comprises a non-uniform scaler and an equalizer. The non-uniform scaler receives the virtual scan line signal and scales samples in the virtual scan line signal to generate a non-uniformly scaled virtual scan line signal. The equalizer receives the non-uniformly scaled virtual scan line signal and equalizes the non-uniformly scaled virtual scan line signal so as to at least partially compensate for the aberration caused by the lens assembly.

According to another embodiment, an imaging system comprises an imager that forms an image of an object in a field of view, a rotationally symmetric lens assembly disposed between the imager and the object, and an equalizer. The rotationally symmetric lens assembly provides increased collection efficiency for a given depth of field, whereby the rotationally symmetric lens assembly causes aberration, compared to a well-focused lens. The rotationally symmetric lens assembly comprises a front negative lens, a rear positive lens, and an aperture positioned between the front and rear lenses. The equalizer, which is connected to the imager, receives image data and at least partially compensates for the aberration caused by the rotationally symmetric lens assembly.

According to yet another embodiment, a method passes light from an object through a negative lens, blocks light from a periphery region of the negative lens while passing light from a central region of the negative lens, passes the light from the central region of the negative lens through a positive lens, forms an image of the object based on the light from the positive lens, generates a virtual scan line signal comprising samples taken from a line across the image, scales the samples of the virtual scan line signal by non-uniform amounts, and equalizes the non-uniformly scaled virtual scan line signal so as to at least partially compensate for blurriness caused by one or more of the lenses.

Details concerning the construction and operation of particular embodiments are set forth in the following sections.

DETAILED DESCRIPTION OF EMBODIMENTS

With reference to the above-listed drawings, this section describes particular embodiments and their detailed construction and operation. In general, the embodiments described below provide improved imaging over an extended depth of field without reducing aperture size and therefore without sacrificing light gathering efficiency caused by a reduced aperture size. The inventors have realized that in many imaging applications, the lens system need not provide diffraction-limited optical performance, but only provide sufficient performance for the given application. The required resolution of the lens is often limited by the resolution of the imager itself, dictated by the pixel size. Therefore, the lens designer is free to reduce the optical performance of a lens system in ways that do not detract from the total system resolution, yielding additional degrees of freedom in the design that can be used to enhance other more desirable properties, such as increased collection efficiency due to a larger aperture.

As one skilled in the art will appreciate, certain embodiments may be capable of achieving certain advantages over the known prior art, including some or all of the following: (1) extended depth of field compared to systems characterized by a single focus point; (2) greater light collection efficiency; (3) faster repetitive imaging; (4) utilization of optical components that are simpler and less expensive to fabricate; and (5) axial symmetry, which simplifies equalization (e.g., one-dimensional equalization, rather than two-dimensional equalization). These and other advantages of various embodiments will be apparent upon reading the following.

Figure 1:
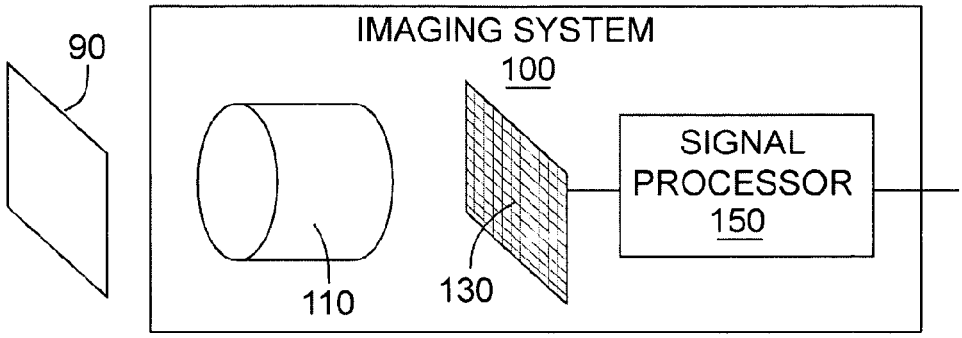
FIG. 1 is diagram of a system according to one embodiment.

FIG. 1 is diagram of a system 100 for forming an image of an object 90, according to one embodiment. The object 90 may be anything, but in one preferred use, the object 90 is an item upon which is printed an optical code, such as a bar code. The system 100 comprises a lens assembly 110, an imager 130, and a signal processor 150. The system 100 may comprise other components not illustrated. The lens assembly 110 is a rotationally symmetric lens with increased light collection efficiency with respect to a well-focused lens for a given depth of field. One version of the lens assembly 110 is described in greater detail below with reference to FIG. 2. The imager 130 forms an electronic image of the object 90. The imager 130 can be a digital camera, such as a charge-coupled device (CCD) camera or CMOS (complementary metal-oxide semiconductor) camera, both of which form a rectangular two-dimensional array of pixels, which together constitute an electronic representation of the image. Each pixel location stores data indicative of the light intensity at that location of the image. The light intensity data for each pixel may be a color-coded vector (e.g., red-green-blue) or monochrome intensity (e.g., grayscale).

Figures 2A, 2B:
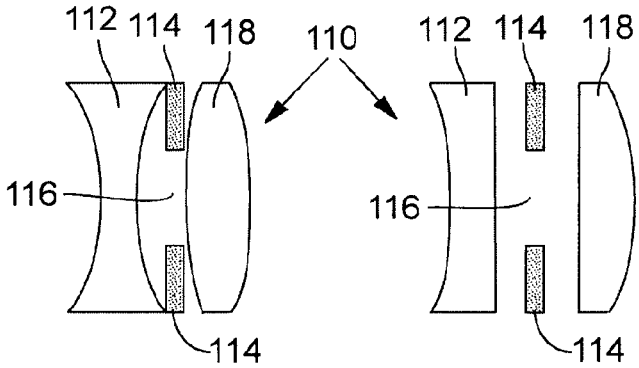
FIGS. 2A and 2B are side views of two versions of the lens assembly of FIG. 1.

FIGS. 2A and 2B are side views of two versions of the lens assembly 110. The lens assembly 110 comprises a front negative lens 112, followed by a spacer 114, followed by a rear positive lens 118. The spacer 114, which may be a washer or something similar, defines an aperture 116, preferably circular in shape, through which light from the front negative lens 112 passes to the rear positive lens 118 while blocking light from the periphery of the front negative lens 112. The spacer 114 preferably has a thickness that establishes a desired spacing between the lenses 112 and 118. Because the lens assembly 110 and its components are axially or rotationally symmetric, they are inexpensive, simple to manufacture and assemble, and offer other advantages such as simplification of the signal processing of the image data, as discussed in greater detail below with reference to FIG. 11. For example, the lenses 112 and 118 can be ground using standard techniques, and the lenses 112 and 118 and the spacer 114 can be assembled in a hollow tube (not shown), which holds the components in place. The arrangement of lenses in FIGS. 2A and 2B provides under-corrected spherical aberration, which enables increased collection efficiency in providing a desired depth of field, or, stated differently, extends the depth of field for a given size lens aperture.

While the lens assembly 110 shown in FIG. 2A illustrates a bi-concave front negative lens 112 and a bi-convex rear positive lens 118, the lens assembly 110 may comprise any suitable arrangement of a negative lens followed by a positive lens that extends the depth of field. One alternative lens assembly is illustrated in FIG. 2B, in which the front negative lens 112 is plano-concave, and the rear positive lens 118 is plano-convex. Hybrids of the arrangements illustrated in FIGS. 2A and 2B are also possible (e.g., one bi-curvature lens and one [piano] *plano* lens).

One advantage of the lens assembly 110 over other types of arrangements that can provide an extended depth of field is that the aperture 116 can be made larger in the lens assembly 110. A larger aperture improves light collection efficiency, which in turn permits faster imaging. Thus, the imaging system 100 can accurately scan bar codes, for example, moving across the field of view at a higher speed than systems employing a well-focused lens and having a similar depth of field. The price paid for that increased collection efficiency is increased aberration with respect to a well-focused lens, requiring post processing of the collected image in some instances.

The lens assembly 110 preferably has a generalized axicon focus function. In other words, the lens assembly 110's optical impulse response or point spread function is approximately constant as a function of object distance over a certain distance range. While the lens assembly 110 shown in FIGS. 2A and 2B comprise two optical elements and an aperture, alternative lens assemblies may include a greater number of elements or a smaller number of elements (e.g., a single axicon or generalized axicon lens). The lens assembly 110 can also be said to be a soft-focus lens or can be said to introduce a rather large amount of spherical aberration. The lens assembly 110 may introduce under-corrected spherical aberration or over-corrected spherical aberration, although under-corrected spherical aberration typically achieves better results. The lens assembly 110 may also introduce chromatic aberration.

The exact prescriptions for the front negative lens 112 and the rear positive lens 118, as well as the spacing of the lenses from the aperture 116, and the size of the aperture can be determined using numerical optimization techniques. Given basic lens shapes or types, an ordering of optical elements, and performance specifications, such as field of view, depth of field, resolution within the field, etc., a computer programmed to perform lens design can determine inter-element spacings and lens prescriptions. For example, a lens assembly of the configuration of FIG. 2B has been designed using the ZEMAX® optical design program and tested to prove the concept. In that prototype lens assembly, the front negative lens 112 was made of optical glass BK-7 with a radius of curvature of 6.2 mm (millimeters) and center thickness of 1.5 mm; the spacer 114 had a thickness of 0.45 mm and the clear aperture 116 had a diameter of 2 mm; the rear positive lens 118 was made of optical glass SF-11 with a radius of curvature of 4.71 mm and a center thickness of 2.5 mm; the distance from the back surface of the rear positive lens 118 and the imager 130 was 9.86 mm. That prototype lens assembly had a 20% modulation transfer function at the target plane at 1.5 cycles/mm at a target distance range from 25 mm to 200 mm (All of the preceding numerical parameters are approximate.) In this example, the lens elements are spherical, but that need not be the case. In fact, aspheric lens surfaces may achieve even better results, due to the ability to better control aberrations of the final lens system, or to provide an equivalently performing lens system with fewer elements.

Figure 3:
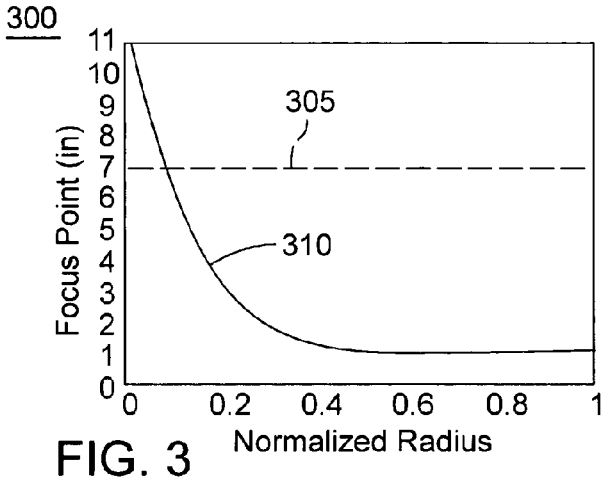
FIG. 3 is a plot of the focus point versus lens radius for a well-focused lens and a lens according to one embodiment.

When designing optical systems, it is often convenient to start with a thin lens approximation for initial visualization. While refractive lenses have significant thickness, a thin lens is well approximated by a diffractive surface. Furthermore, to predict the performance of an imaging system, it is often convenient to trace the light rays in reverse, assuming that a point on the optical axis on the imager plane is a point source, and tracing the rays through the lens to the target. With these assumptions, a comparison of the lens assembly 110 to a well-focused lens can be undertaken. FIG. 3 is a plot 300 of the distance from the lens (focal point on plot) versus the radius of an annular ring on the lens surface where light rays were emitted. The light rays of a well-focused lens all arrive at the same distance (7 inches in FIG. 3), as shown by the constant curve 305, while the rays of the lens assembly 110 focus at different distances as a function of radius of the lens, as shown by the curve 310. This is characteristic of under-corrected spherical aberration, where the outer portion of the lens focuses closer than the central (paraxial) region.

Figure 4:
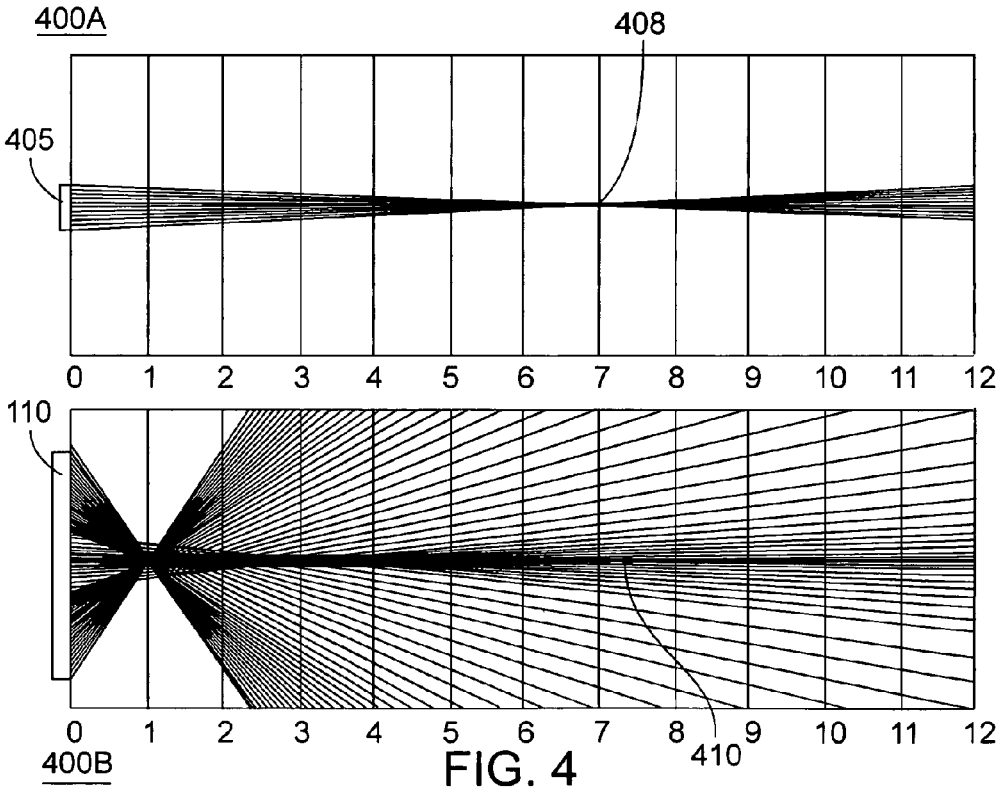
FIG. 4 is a set of ray trace plots of a well-focused lens and a lens assembly according to one embodiment.
Figure 5:
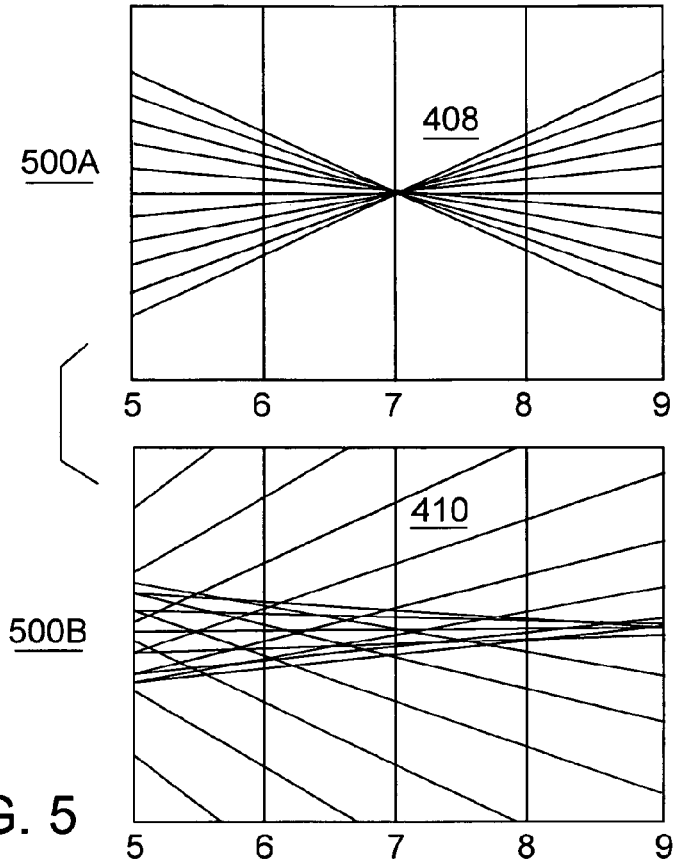
FIG. 5 is a set of zoomed-in ray trace plots of FIG. 4.

FIG. 4 shows ray plots 400A and 400B of a well-focused lens 405 (top) and the lens assembly 110 (bottom), respectively. The aperture size (diameter) of the lens assembly 110 is larger than the well-focused lens 405 to achieve the same imaging results. The well-focused lens 405 focuses all of the light rays at a single target distance 408, while the lens assembly 110 focuses light rays at a wide range of distances. The result is a narrow band of relatively focused rays 410. FIG. 5 shows ray plots 500A and 500B in zoomed-in portions of regions 408 and 410 of FIG. 4, respectively. Notice the rays of the lens 405 arrive at a single distance while rays from the lens assembly 110 are spread out in a configuration typical of under-corrected spherical aberration.

Figure 6:
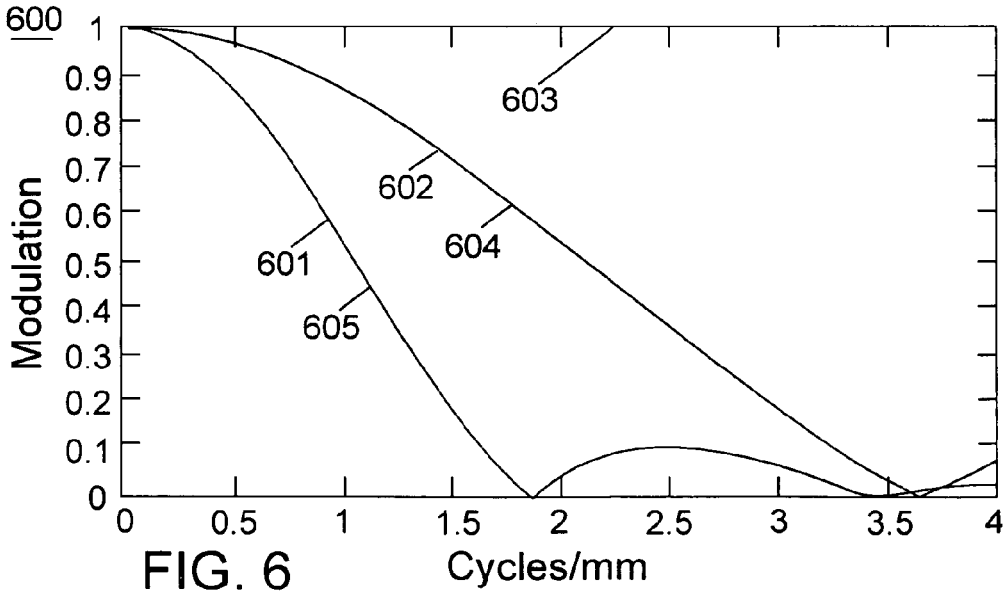
FIG. 6 is a modulation transfer function plot of a well-focused lens.

A common way to determine the resolution of an optical system is via the modulation transfer function, which measures an imaging system's ability to resolve spatial detail. An MTF plot displays modulation, (white-black)/white, of the image of a sinusoidal target versus spatial frequency (specified in cycles/mm or line pairs/mm, aka lp/mm). The MTF is unity at zero spatial frequency and typically decreases with increasing frequency, as the optical system blurs the target. FIG. 6 shows a plot 600 of the MTF of the well-focused lens 405 at five different distances from the lens. The lens is focused to 7 inches, represented by curve 603 that has high resolution (constant MTF equal to one across the entire range of spatial frequency in this plot). Curves 602 and 604 are at 6 inches and 8 inches, respectively, and show a decrease in modulation as the light rays are no longer focused at a point at those distances. Lastly, curves 601 and 605 are at 5 inches and 9 inches. Further reduction in modulation is evident as distance away from the focal point increases. The lens 405 was designed to provide 20% modulation (0.2 on graph) at 1.5 cycles/mm at the extents of the depth of field, namely 5 inches and 9 inches, for a total depth of field of 4 inches. The symmetric nature of this MTF plot (for example, 601 and 605 having the same value) is typical of a well-focused lens, and is evident from inspection of the light rays in FIG. 5.

Figure 7:
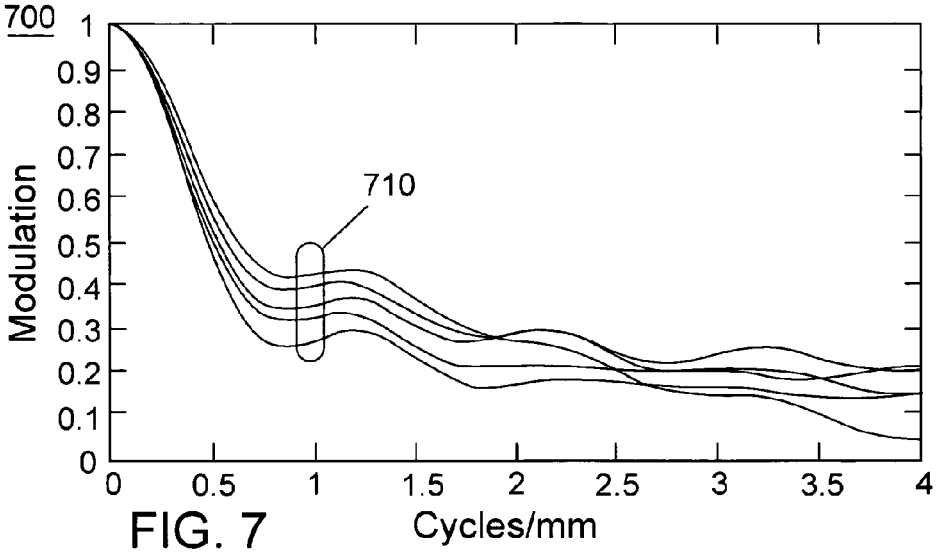
FIG. 7 is a modulation transfer function plot of a lens according to one embodiment.

FIG. 7 shows a plot 700 of a set of MTF curves 710 for the lens assembly 110 at the same distances from the lens, namely 5 inches to 9 inches in 1 inch increments. All of the MTF curves 710 are of a roughly similar shape, with a steep drop in modulation at low spatial frequencies (from 0 to 0.5 cycle/mm in this plot) and a gradual drop in modulation at high spatial frequencies (above 0.5 cycle/mm in this plot). This particular version of the lens assembly 110 was designed to have at least 20% modulation at 1.5 cycles/mm across the entire range of distances from 5 inches to 9 inches. This version of the lens assembly 110 has a focus versus radius of lens shown in FIG. 3 that follows the equation below:

$$z(r) = d_1 + (d_2 - d_1)\left(\frac{R - r}{R}\right)^E.$$

A well-focused lens can also be modeled by a degenerate case of the previous equation. For example, the lens 405 has the following parameters: R=0.045 inch, $d_1$=7 inches, $d_2$=7 inches, and E=1. One version of the lens assembly 110 has the following parameters: R=0.225 inch, $d_1$=1 inch, $d_2$=12 inches, and E=7. Therefore, that lens assembly 110 fulfills the same resolution goals with an aperture that is five times larger in diameter, which therefore collects 25 times more light since collection efficiency is proportional to the square of the lens diameter.

Figure 8:
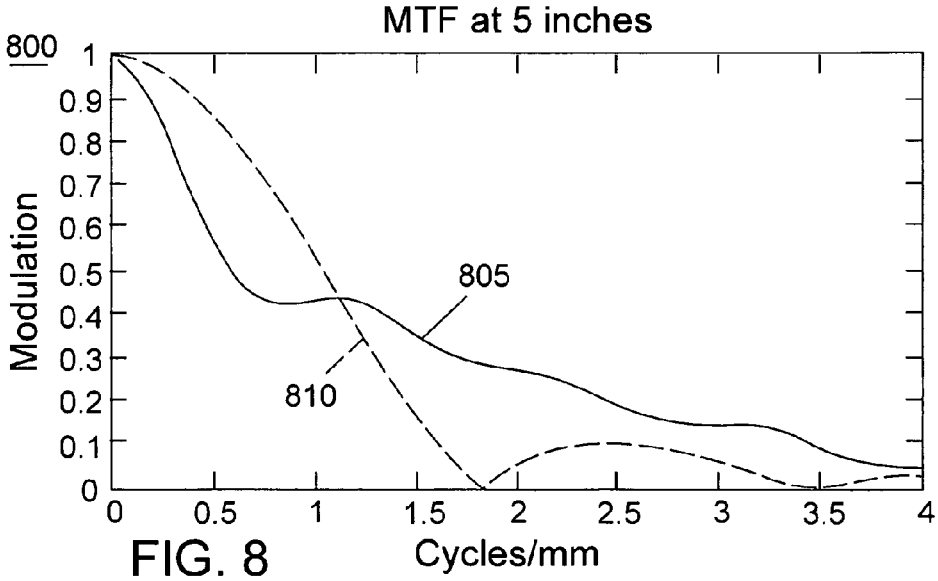
FIG. 8 is a comparison of modulation transfer functions of a well-focused lens and a lens assembly according to one embodiment at a near field distance.
Figure 9:
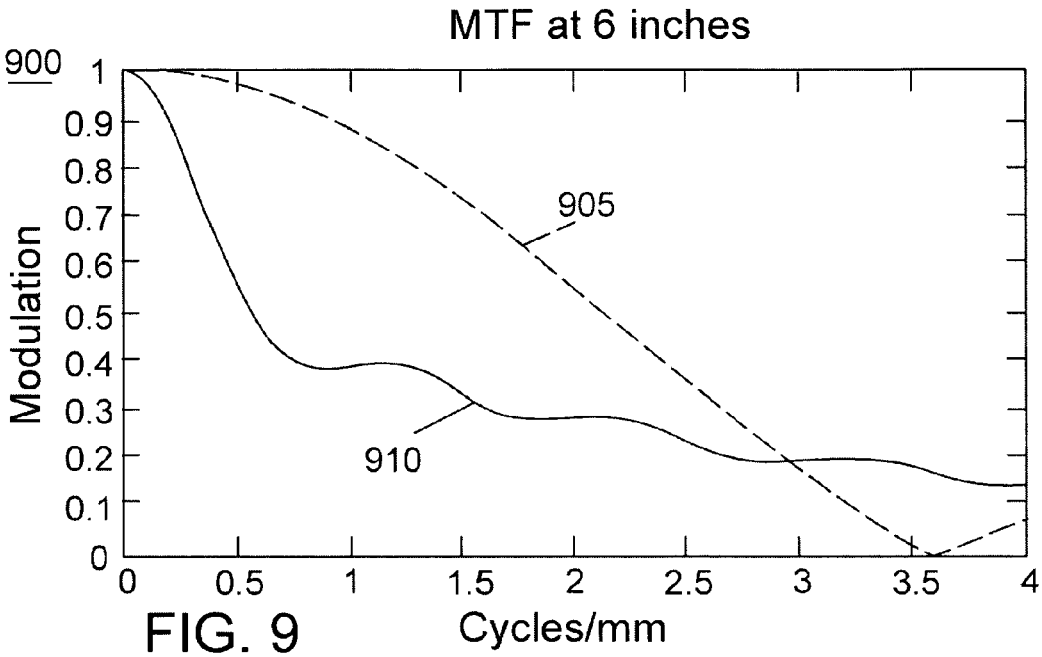
FIG. 9 is a comparison of modulation transfer functions of a well-focused lens and a lens assembly according to one embodiment at another distance.

FIG. 8 is a plot 800 comparing the MTF at the near-field distance of 5 inches of the well-focused lens 405 (curve 805) and the lens assembly 110 (curve 810). It can be seen that the shape of the MTF curves of the two lenses are very different, but both meet the design requirement of at least 20% modulation at 1.5 cycles/mm. FIG. 9 is a plot 900 comparing the MTF of the same lenses at a mid-field distance of 6 inches. Curve 905 from the well-focused lens 405 has higher modulation than curve 910 from the lens assembly 110, but they both exceed 20% modulation at 1.5 cycles/mm.

Figure 10:
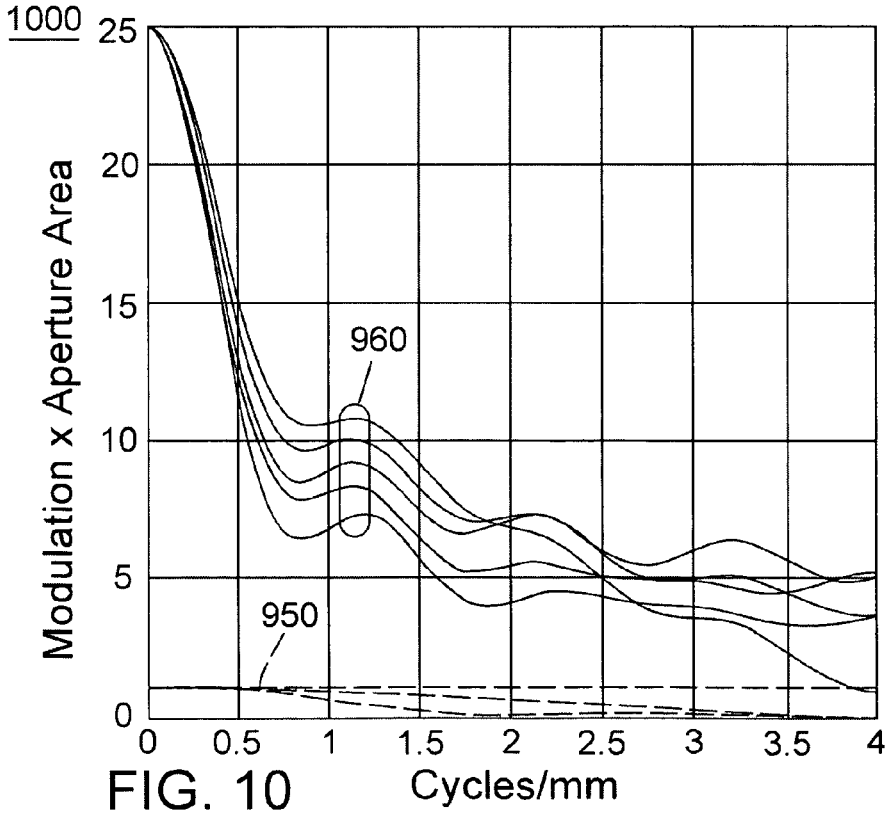
FIG. 10 is a comparison of the total transfer function of a well-focused lens and a lens assembly according to one embodiment.

One advantage of the lens assembly 110 over the [well-corrected] *well-focused* lens 405 can be appreciated more fully by referring to the plot 1000 in FIG. 10. In that plot, each of the MTF curves 710 and the curves 601-605 has been multiplied by the aperture area (the square of the diameter) of each lens, yielding what could be called a Total Transfer Function (TTF), which takes into account the total amount of signal that can be captured with a given imager exposure time. The TTF curves in the plot 1000 have been normalized to the low frequency value of the [well-corrected] *well-focused* lens 405. The curves 960 of the lens assembly 110 can be seen to have a much larger TTF than well-focused lens curves 950. Significantly, at the design target of 1.5 cycles/mm, modulation 960 from lens 402 is at least 7.4 times larger than modulation 950 from lens 400 at all distances from 5 inches to 9 inches. Therefore, the lens 402 achieves equivalent depth of field with much larger collection efficiency. Those skilled in the art can appreciate that by a similar means, a lens can be designed that has larger depth of field than lens 400 at an equivalent aperture size by incorporating lens aberration as described herein. A similar design procedure, using an optical design program such as ZEMAX®, can be used to design refractive lenses with similar performance as shown in these graphs.

Because the lens assembly 110 collects more useful light than a well-focused lens, it can be used to form images at a faster rate (i.e., lower frame exposure time) and thereby effectively image faster moving objects as they move across the field of view. Because the depth of field is extended, the effective viewing volume is increased. The result is an imaging system with higher performance, for example, a bar code reader with enhanced ability to scan bar codes in a larger scanning volume with higher throughput. The price paid for the extended depth of field is less modulation at high spatial frequencies (due to spherical aberration) as compared to a well-focused lens. This is evident by reference to FIG. 9. That attenuation can be compensated with an equalizer to modify the overall transfer function of the lens assembly 110 and the equalizer to approach that of a well-focused lens across the entire depth of field. That compensation or equalization can be accomplished by the signal processor 150. It is desirable to have the MTF be relatively constant versus distance, as shown in FIG. 7, to enable equalization to be performed without the knowledge of the target distance.

Figure 11:
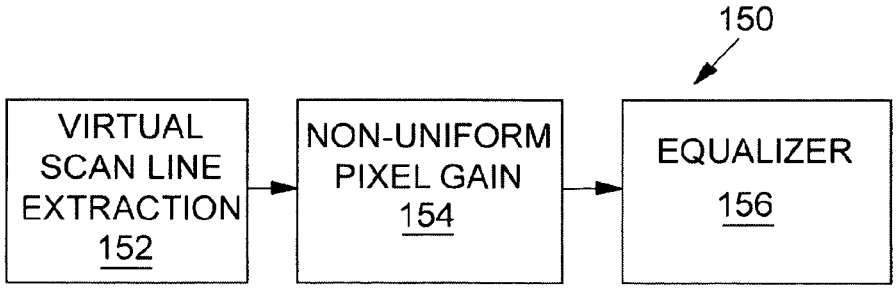
FIG. 11 is a block diagram of one version of the signal processor of FIG. 1.

The signal processor 150 is preferably a digital signal processor (DSP), as shown in FIG. 11. The signal processor 150 comprises a virtual scan line extraction module 152, a nonuniform pixel gain 154, and an equalizer 156. The virtual scan line extraction module 152, which is optional, reads and/or assembles samples or pixels from the imager 130 lying along one or more lines across the image at arbitrary angles or in another desired scan pattern. The resulting ordered set of pixels is sometimes referred to as a "virtual scan line" because it is analogous to a signal generated by reflection of a moving laser beam spot as it scans across the object 90.

The nonuniform pixel gain 154, although also optional, can be advantageous in that it can suppress pixel nonuniformity that arises from such causes as differences in gain from pixel to pixel in the imager 130. If pixel nonuniformity is large and unsuppressed, then it can obscure the useful modulation in the image. For example, the useful modulation may ride on top of a nearly black part of the image and then on top of a nearly white part of the image, causing noise to be more significant in the white part than in the black part. As the equalizer amplifies high frequencies, in the attempt to restore the image to a more well-focused state, noise will be amplified as well. If the pixel nonuniformity noise is the dominant noise source, then the benefit gained from the increased aperture size will be exactly compensated by the increased noise due to pixel nonuniformity. If random noise is the dominant noise source, then increases in the signal level due to the increase in aperture size will exceed the amplification of noise due to the equalizer, yielding improved signal-to-noise ratio (SNR), and more rapid imaging. The nonuniform pixel gain 154 can compensate for that innate nonuniformity by providing more gain to pixels that are naturally blacker and less gain (even attenuation) to pixels that tend to be whiter. The nonuniform pixel gain 154 is preferably an array of scale factors that are multiplied by the imager's intensity values on a pixel-by-pixel basis. The nonuniform pixel gain 154 can be calibrated by using a uniform light source, preferably in conjunction with the lens assembly 110 so that any field loss caused by the lens assembly 110 can be taken into account when determining the scale factors that make up the nonuniform pixel gain 154. Typically, the effects of random noise (such as from the pixel amplifiers) dominate in black regions of the image. Pixel nonuniformity can be dominant over random noise in white regions, however. In white regions, shot noise (which is another type of random noise) due to the discrete number of photons making up the signal, can under some circumstances be dominant over pixel nonuniformity. Under these conditions, nonuniform pixel gain is less helpful, as the dominant noise sources are random.

The equalizer 156 is a filter whose transfer function preferably approximates the inverse of the MTF of the lens assembly 110, so as to cancel or compensate completely or partially for the blurriness or aberration caused by the lens assembly 110. Equivalently, the equalizer may be the ratio of a desired lens MTF, such as curve 905 and the actual lens MTF, such as curve 910. In this case, the equalizer serves to create the same quality of image that would have been obtained with a lens of MTF curve 905. This may be performed in order to reduce the gain of the equalizer at high spatial frequencies, and thus reduce the amplification of noise. The equalizer 156 can be thought of as a high-pass filter, with unity gain at low frequencies and higher gain at high spatial frequencies. Unfortunately, noise is amplified at high spatial frequencies. But since the total collection is increased with lens assembly 110, the increased signal more than compensates for the increase in noise, yielding an increase in SNR, allowing for a reduced exposure time and higher product sweep speeds. It is desired that the MTF of the lens assembly 110 does not change appreciably as a function of distance, so the equalizer 156 can have a single, fixed transfer function. If the MTF changes significantly over distance, an equalizer can be chosen that matches the MTF at that distance, if the distance is known; alternatively, multiple equalizers can be tried in sequence or in parallel on the same image data and post processing can be used to determine which one yields the best result.

Typically the equalizer 156 is implemented as a digital finite impulse response (FIR) filter. Such techniques for generating a FIR equalizer from a known transfer function are well known in the art, using such techniques as a windowed frequency sampling technique or Weiner filtering.

The signal processor 150, and the equalizer 156 in particular, can be implemented either in hardware or software. They can exist in a variety of forms both active and inactive. For example, they can exist as one or more software programs comprised of program instructions in source code, object code, executable code or other formats. Any of the above formats can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. An imaging system comprising:

an imager that forms an electronic image of an object in a field of view;

a rotationally symmetric lens assembly disposed between the imager and the object, the lens assembly providing increased collection efficiency for a desired depth of field, whereby the lens assembly causes aberration, compared to a well-focused lens; and a signal processor connected to the imager, wherein the signal processor receives image data and generates a virtual scan line signal comprising samples taken from a line across the image, wherein the signal processor comprises:

a non-uniform scaler that receives the virtual scan line signal and scales samples in the virtual scan line signal to generate a non-uniformly scaled virtual scan line signal; and an equalizer that receives the non-uniformly scaled virtual scan line signal and equalizes the non-uniformly scaled virtual scan line signal so as to at least partially compensate for the aberration caused by the lens assembly.

2. An imaging system according to claim 1, wherein the rotationally symmetric lens assembly comprises a generalized axicon lens.

3. An imaging system according to claim 1, wherein the rotationally symmetric lens assembly comprises:

a front negative lens;

a rear positive lens; and an aperture positioned between the front and rear lenses.

4. An imaging system according to claim 3, wherein the front negative lens is a biconcave lens.

5. An imaging system according to claim 3, wherein the front negative lens is a plano-concave lens.

6. An imaging system according to claim 3, wherein the rear positive lens is a biconvex lens.

7. An imaging system according to claim 3, wherein the rear positive lens is a plano-convex lens.

8. An imaging system according to claim 1, wherein the equalizer is one-dimensional, whereby the imaging system is largely invariant to angular orientation of the [virtual scan] line *across the image from which the samples are taken for the virtual scan line signal*.

9. An imaging system according to claim 1, wherein the equalizer has a transfer function that is approximately an inverse of a modulation transfer function of the rotationally symmetric lens assembly.

10. An imaging system according to claim 1, wherein the rotationally symmetric lens assembly has an aperture size greater than a well-focused lens having a similar depth of field as the rotationally symmetric lens assembly, whereby the imaging system generates well-formed images of the object as the object moves across the field of view at a higher speed than if a well-focused lens were utilized.

11. An imaging system comprising:

an imager that forms an electronic image of an object in a field of view;

a rotationally symmetric lens assembly disposed between the imager and the object, the rotationally symmetric lens assembly providing increased collection efficiency for a desired depth of field, whereby the rotationally symmetric lens assembly causes aberration, compared to a well-focused lens, the rotationally symmetric lens assembly comprising:

a front negative lens;

a rear positive lens; and an aperture positioned between the front and rear lenses; and an equalizer connected to the imager, wherein the equalizer receives image data and at least partially compensates for the aberration caused by the rotationally symmetric lens assembly.

12. An imaging system according to claim 11, wherein the rotationally symmetric lens assembly is a generalized axicon.

13. An imaging system according to claim 11, wherein the equalizer is one-dimensional.

14. An imaging system according to claim 13, wherein the input to the equalizer is a virtual scan line signal comprising samples taken from a line across the image.

15. An imaging system according to claim 11, wherein the front negative lens is a biconcave lens.

16. An imaging system according to claim 11, wherein the front negative lens is a [piano-concave] *plano-concave* lens.

17. An imaging system according to claim 11, wherein the rear positive lens is a biconvex lens.

18. An imaging system according to claim 11, wherein the rear positive lens is a plano-convex lens.

19. An imaging system according to claim 11, wherein the equalizer has a transfer function that is approximately an inverse of a modulation transfer function of the rotationally symmetric lens assembly.

20. An imaging system according to claim 11, wherein the rotationally symmetric lens assembly has an aperture size greater than a well-focused lens having a similar depth of field as the rotationally symmetric lens assembly, whereby the imaging system generates well-formed images of the object as the object moves across the field of view at a higher speed than if a well-focused lens were utilized.

21. An imaging system according to claim 11, wherein the image comprises a plurality of pixels, the imaging system further comprising:

a plurality of pixel-specific gain elements that scale pixel values individually so as to compensate for nonuniformity in the formation of the intensity of the pixel values.

22. A method comprising:

passing light from an object through a negative lens;

blocking a light from a periphery region of the negative lens while passing light from a central region of the negative lens;

passing the light from the central region of the negative lens through a positive lens;

forming an image of the object based on the light from the positive lens;

generating a virtual scan line signal comprising samples taken from one or more lines across the image at *one or more* arbitrary angles;

scaling the samples of the virtual scan line signal by non-uniform amounts; and equalizing the non-uniformly scaled virtual scan line signal so as to at least partially compensate for blurriness caused by one or more of the lenses.

*23. An imaging system according to claim 1, wherein the virtual scan line signal comprises an ordered set of pixels that is taken from a line that extends across the image at a slanted angle, and wherein the non-uniform scaler scales pixels within the ordered set of pixels to generate a non-uniformly scaled virtual scan line signal.*

*24. An imaging system according to claim 23, wherein the imager comprises a two-dimensional array of pixels such that the pixels are arranged in lines that extend in two directions, and wherein the line from which the ordered set of pixels is taken extends across the image at a non-zero angle relative to the lines of pixels of the two-dimensional array.*

*25. An imaging system according to claim 1, wherein the signal processor generates multiple virtual scan line signals comprising samples taken from multiple lines that extend across the image at multiple angles, at least two of which are different from each other.*

*26. An imaging system according to claim 25, wherein the imager comprises a two-dimensional array of pixels such that the pixels are arranged in lines that extend in two directions,*

*and wherein the multiple lines from which samples are taken extend across the image at multiple angles, at least two of which are different from each other, relative to the lines of pixels of the two-dimensional array.*

*27. A system for reading an optical code, the system comprising:*

*an imager that forms an electronic image of an object bearing an optical code in a field of view;*

*a rotationally symmetric lens assembly disposed between the imager and the object, the lens assembly providing increased collection efficiency for a desired depth of field, whereby the lens assembly causes aberration, compared to a well-focused lens; and*

*a signal processor connected to the imager, wherein the signal processor receives image data and generates one or more virtual scan line signals comprising samples taken from one or more lines across the image.*

*28. A system according to claim 27, wherein the signal processor comprises:*

*an equalizer that receives a virtual scan line signal and equalizes the received virtual scan line signal so as to at least partially compensate for the aberration caused by the lens assembly.*

*29. A system according to claim 28, wherein the signal processor further comprises:*

*a non-uniform scaler that receives a virtual scan line signal and scales samples in the virtual scan line signal to generate a non-uniformly scaled virtual scan line signal for input to the equalizer.*

*30. A system according to claim 28, wherein the equalizer is one-dimensional, whereby the system is largely invariant to angular orientation of the line across the image from which the samples are taken for the virtual scan line signal.*

*31. A system according to claim 28, wherein the equalizer has a transfer function that is approximately an inverse of a modulation transfer function of the rotationally symmetric lens assembly.*

*32. A system according to claim 27, wherein the rotationally symmetric lens assembly comprises a generalized axicon lens.*

*33. A system according to claim 27, wherein the rotationally symmetric lens assembly comprises:*

*a front negative lens;*

*a rear positive lens; and*

*an aperture positioned between the front and rear lenses.*

*34. A system according to claim 33, wherein the front negative lens is a biconcave lens.*

*35. A system according to claim 33, wherein the front negative lens is a plano-concave lens.*

*36. A system according to claim 33, wherein the rear positive lens is a biconvex lens.*

*37. A system according to claim 33, wherein the rear positive lens is a plano-convex lens.*

*38. A system according to claim 27, wherein the rotationally symmetric lens assembly has an aperture size greater than a well-focused lens having a similar depth of field as the rotationally symmetric lens assembly, whereby the system generates well-formed images of the object as the object moves across the field of view at a higher speed than if a well-focused lens were utilized.*

*39. A system according to claim 27, wherein the optical code is a bar code.*

*40. A system according to claim 27, wherein each of the one or more virtual scan line signals comprises an ordered set of pixels that is taken from a line that extends across the image at a slanted angle.*

*41. A system according to claim 40, wherein the imager comprises a two-dimensional array of pixels such that the pixels are arranged in lines that extend in two directions, and wherein the line from which the ordered set of pixels is taken extends across the image at a non-zero angle relative to the lines of pixels of the two-dimensional array.*

*42. A system according to claim 27, wherein the signal processor generates multiple virtual scan line signals comprising samples taken from multiple lines that extend across the image at multiple angles, at least two of which are different from each other.*

*43. A system according to claim 42, wherein the imager comprises a two-dimensional array of pixels such that the pixels are arranged in lines that extend in two directions, and wherein the multiple lines from which samples are taken extend across the image at multiple angles, at least two of which are different from each other, relative to the lines of pixels of the two-dimensional array.*

*44. An imaging system comprising:*

*an imager that forms an electronic image of an optical code on an object in a field of view;*

*a rotationally symmetric lens assembly disposed between the imager and the object, the rotationally symmetric lens assembly providing increased collection efficiency for a desired depth of field, whereby the rotationally symmetric lens assembly causes aberration, compared to a well-focused lens, the rotationally symmetric lens assembly comprising:*

*a front negative lens;*

*a rear positive lens; and*

*an aperture positioned between the front and rear lenses; and*

*a signal processor connected to the imager and configured to generate one or more virtual scan line signals comprising samples taken from one or more lines across the image.*

*45. An imaging system according to claim 44, wherein the signal processor comprises an equalizer connected to the imager, wherein the equalizer receives image data and at least partially compensates for the aberration caused by the rotationally symmetric lens assembly.*

*46. An imaging system according to claim 45, wherein the equalizer is one-dimensional.*

*47. An imaging system according to claim 45, wherein the input to the equalizer is a virtual scan line signal comprising samples taken from a line across the image.*

*48. An imaging system according to claim 45, wherein the equalizer has a transfer function that is approximately an inverse of a modulation transfer function of the rotationally symmetric lens assembly.*

*49. An imaging system according to claim 44, wherein the rotationally symmetric lens assembly is a generalized axicon.*

*50. An imaging system according to claim 44, wherein the front negative lens is a biconcave lens.*

*51. An imaging system according to claim 44, wherein the front negative lens is a plano-concave lens.*

*52. An imaging system according to claim 44, wherein the rear positive lens is a biconvex lens.*

*53. An imaging system according to claim 44, wherein the rear positive lens is a plano-convex lens.*

*54. An imaging system according to claim 44, wherein the rotationally symmetric lens assembly has an aperture size greater than a well-focused lens having a similar depth of field as the rotationally symmetric lens assembly, whereby the imaging system generates well-formed images of the object as the object moves across the field of view at a higher speed than if a well-focused lens were utilized.*

*55. An imaging system according to claim 44, wherein the image comprises a plurality of pixels, the imaging system further comprising:*

*a plurality of pixel-specific gain elements that scale pixel values individually so as to compensate for nonuniformity in the formation of the intensity of the pixel values.*

*56. An imaging system according to claim 44, wherein the optical code is a bar code.*

*57. A method comprising:*

*passing light from an optical code on an object through a negative lens;*

*blocking a light from a periphery region of the negative lens while passing light from a central region of the negative lens;*

*passing the light from the central region of the negative lens through a positive lens;*

*forming an image of the optical code based on the light from the positive lens; and*

*generating at least one virtual scan line signal comprising samples taken from one or more lines across the image.*

*58. A method according to claim 57, further comprising:*

*scaling the samples of the virtual scan line signal by non-uniform amounts; and*

*equalizing the non-uniformly scaled virtual scan line signal so as to at least partially compensate for blurriness caused by one or more of the lenses.*

*59. A method according to claim 57, further comprising:*

*equalizing the virtual scan line signal so as to at least partially compensate for blurriness caused by one or more of the lenses.*

*60. A method according to claim 57, wherein the one or more lines across the image include lines at different angles.*

*61. A method according to claim 57, wherein the optical code is a bar code.*

*62. A method according to claim 57, wherein the at least one virtual scan line signal comprises an ordered set of pixels taken from a line across the image at a slanted angle.*

*63. A method according to claim 57, further comprising generating multiple virtual scan line signals comprising samples taken from multiple lines across the image at multiple angles, wherein at least two of the angles are different from each other.*

* * * * *